United States Patent
Sugawara

(10) Patent No.: US 12,128,492 B2
(45) Date of Patent: Oct. 29, 2024

(54) NARROW-HOLE ELECTRIC DISCHARGE MACHINE

(71) Applicant: MAKINO MILLING MACHINE CO., LTD., Tokyo (JP)

(72) Inventor: Susumu Sugawara, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 359 days.

(21) Appl. No.: 17/616,838

(22) PCT Filed: Jun. 2, 2020

(86) PCT No.: PCT/JP2020/021790
§ 371 (c)(1),
(2) Date: Dec. 6, 2021

(87) PCT Pub. No.: WO2020/246469
PCT Pub. Date: Dec. 10, 2020

(65) Prior Publication Data
US 2022/0347776 A1    Nov. 3, 2022

(30) Foreign Application Priority Data

Jun. 7, 2019   (JP) .................................. 2019-107312

(51) Int. Cl.
*B23H 11/00*    (2006.01)
*B23H 7/30*    (2006.01)

(52) U.S. Cl.
CPC ............ *B23H 11/006* (2013.01); *B23H 7/30* (2013.01)

(58) Field of Classification Search
None
See application file for complete search history.

(56) References Cited

U.S. PATENT DOCUMENTS

| 5,281,788 A | 1/1994 | Abiko et al. |
| 2017/0259362 A1 | 9/2017 | Katogi et al. |

FOREIGN PATENT DOCUMENTS

| EP | 4098388 A1 | 12/2022 |
| JP | 62277226 A | * 12/1987 |
| JP | H07-164249 A | 6/1995 |

OTHER PUBLICATIONS

Machine translation JP-62277226-A, Jan. 2024.*

* cited by examiner

*Primary Examiner* — Geoffrey S Evans
(74) *Attorney, Agent, or Firm* — Merchant & Gould P.C.

(57) ABSTRACT

This narrow-hole electric discharge machine (100), which performs electric discharge machining by relatively moving a narrow-hole electrode (28) attached to a main spindle (114) and a workpiece (130) attached to a table (118), comprises: a positioning guide (16) which is attached to a guide arm (142) below the main spindle, through which the narrow-hole electrode is inserted such that a lower portion of the narrow-hole electrode is movable in the direction of an axis line (CL0), and which supports the narrow-hole electrode; and a power feeder (10) which is provided at a predetermined position directly above the positioning guide of the guide arm, comes into direct contact with the narrow-hole electrode movable in the axis line direction and feeds power to the narrow-hole electrode, wherein the distance from a power feed position to the tip of the positioning guide is constant regardless of the length of the narrow-hole electrode.

5 Claims, 9 Drawing Sheets

NARROW-HOLE ELECTRIC DISCHARGE MACHINE

This application is a National Stage Application of PCT/JP2020/021790 filed Jun. 2, 2020, which claims benefit of priority to Japanese Patent Application No. 2019-107312, filed Jun. 7, 2019, which applications are incorporated herein by reference. To the extent appropriate, a claim of priority is made to each of the above disclosed applications.

FIELD

The present invention relates to a narrow-hole electric discharge machine for electric-discharge machining of a narrow hole in a workpiece using a rod-shaped or pipe-shaped elongate electrode.

BACKGROUND

In narrow-hole electric-discharge machining, a tip of a rod-shaped or pipe-shaped elongate narrow-hole electrode retained by a rotary spindle is guided toward a machining point of a workpiece surface by an electrode guide arranged near the workpiece, and a narrow hole is machined in the workpiece by relatively feeding the narrow-hole electrode in the Z-axis direction.

Patent Literature 1 describes an electric-discharge machine which performs electric-discharge machining of a narrow hole in a workpiece by retaining one end of a narrow-hole electrode with a chuck provided on the tip of a machining head which is movable in the Z-axis direction, positioning the other end with an electrode guide part so as to face a workpiece in a machining chamber, and applying a pulse-shaped machining voltage from a power supply part between an electrode-side power supply member provided on an upper part of the chuck of the machining head and a workpiece-side electric conduction member attached to the workpiece while feeding the narrow-hole electrode in the Z-axis direction by the machining head.

Citation List

Patent Literature

[PTL 1] Japanese Unexamined Patent Publication (Kokai) No. 7-164249

SUMMARY

Technical Problem

In the narrow-hole electric discharge machine of Patent Literature 1, since the machining voltage is applied to both ends of the narrow-hole electrode during electric-discharge machining, substantially the entire length of the narrow-hole electrode forms a part of an electric circuit for the application of the machining voltage. Thus, as the narrow-hole electrode is consumed and the length is reduced in accordance with the progress of machining, the resistance of the electric circuit to which the machining voltage is applied is reduced, whereby the machining current gradually increases. In particular, recently, since narrow-hole electrodes which are longer than in the prior art have been used to reduce the number of replacements of worn electrodes and improve machining efficiency, changes in machining current during machining also become large, whereby changes in machining speed and the diameter of the hole be machined also become large, which cannot be ignored.

The present invention aims to solve such problems of the prior art, and to provide a narrow-hole electric discharge machine which can stably machine a narrow hole without changes in machining speed or the diameter of the hole to be machined even if the length of the narrow-hole electrode changes during electric-discharge machining.

Solution to Problem

In order to achieve the object described above, according to the present invention, there is provided a narrow-hole electric discharge machine which performs electric-discharge machining on a workpiece by moving a narrow-hole electrode mounted on a spindle and a workpiece attached to a table relative to each other, the narrow-hole electric discharge machine comprising a positioning guide which is attached to a guide arm below the spindle and in which a lower part of the narrow-hole electrode is inserted and supported so that the narrow-hole electrode can move in an axial direction, and a power supply element which is provided in a predetermined position directly above the positioning guide of the guide arm and which directly contacts the narrow-hole electrode, which is movable in the axial direction, and supplies power thereto, wherein a distance from a power supply position to a tip of the positioning guide is constant regardless of the length of the narrow-hole electrode.

Advantageous Effects of Invention

According to the present invention, since the power supply element, which directly contacts and supplies power to the narrow-hole electrode, which is movable in the axial direction, is provided in a predetermined position directly above the positioning guide of the guide arm, the distance from the power supply position to the tip of the positioning guide is constant regardless of the length of the narrow-hole electrode, whereby the machining current between the narrow-hole electrode and the workpiece is constant, and a narrow hole can stably be machined without changes in machining speed or the diameter of the hole to be machined.

DESCRIPTION OF EMBODIMENTS

The preferred embodiments of the present invention will be described below with reference to the attached drawings.

Figure 1:
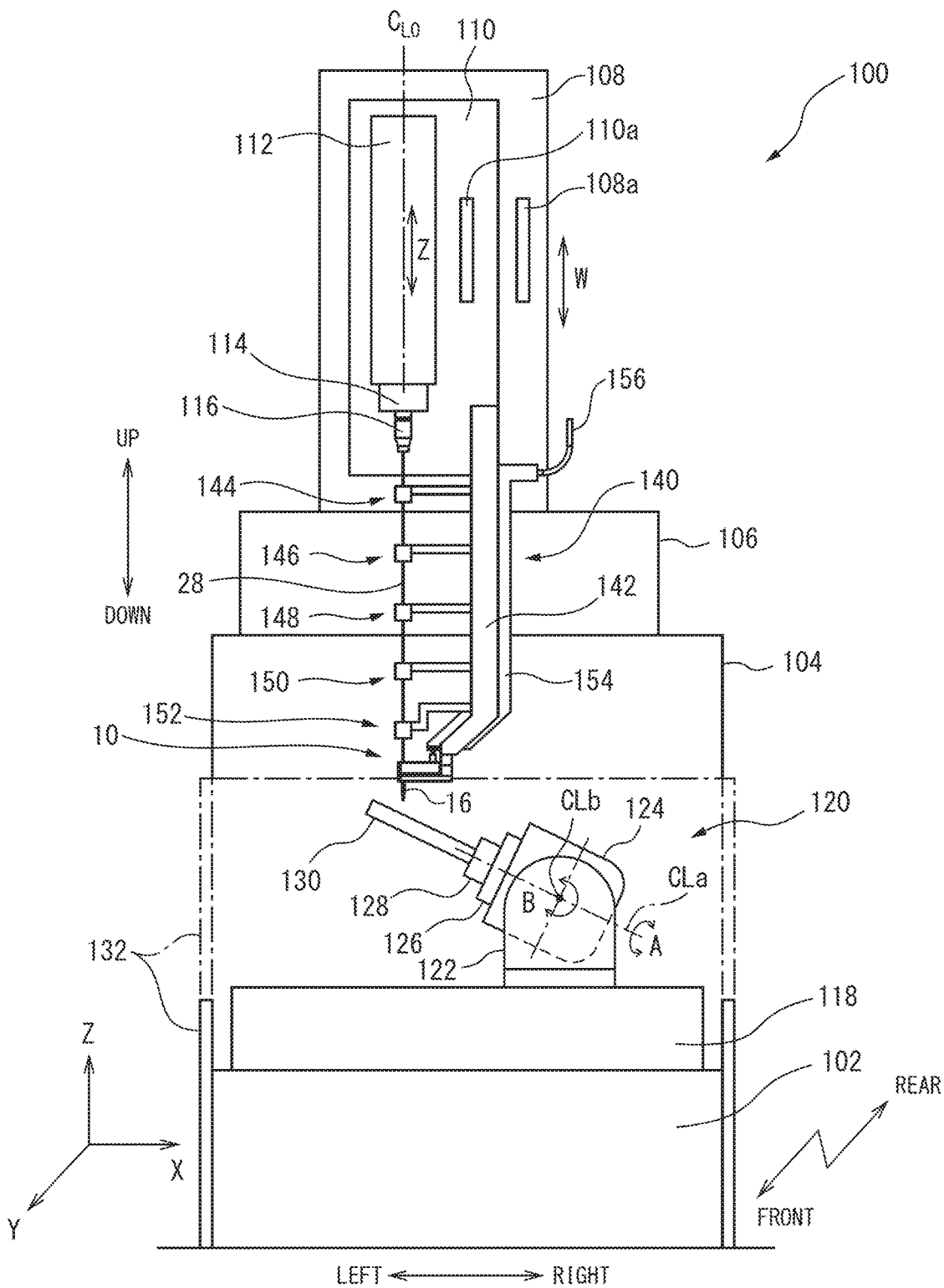
FIG. 1 is a front view of a narrow-hole electric discharge machine according to a preferred embodiment of the present invention.

FIG. 1 is a front view schematically showing primary constituent elements of an electric discharge-machine 100 to which the present invention is applied. Note that below, for convenience, the three orthogonal axial directions (X-axis direction, Y-axis direction, and Z-axis direction) are defined as the left-right directions, the front-rear directions, and the up-down directions, respectively, as shown in the drawings, and the configuration of each part will be described in accordance with these definitions.

In FIG. 1, a column 104 stands on a rear part of an upper surface of a bed 102 serving as a base, and an X slider 106 is attached to an upper surface of the column 104 so as to be movable in the X-axis direction (left-right directions). A ram 108 is supported on an upper surface of the X slider 106 so as to be movable in the Y-axis direction (the front-rear directions; the direction orthogonal to the sheet of FIG. 1). A W-axis slider 110 is attached to a front surface of the ram 108 so as to be reciprocal in the W-axis direction parallel to the Z-axis (the up-down directions).

A spindle head 112 is supported by the front surface of the W-axis slider 110 so as to be movable in the Z-axis direction. A spindle 114 is supported by the spindle head 112 so as to be rotatable about a central axis $C_{L0}$ extending parallel to the Z-axis. An electrode holder 116 is mounted to the tip of the spindle 114 protruding from the bottom surface of the spindle head 112. A W-axis guide assembly 140, which will be described later, is attached to the W-axis slider 110.

The W-axis guide assembly 140 comprises a guide arm 142 attached to the front surface of the W-axis slider 110. The guide arm 142 is a rod-shaped or box-shaped member which extends in the Z-axis direction and which moves in the up-down directions along with the W-axis slider 110. The movement axis of the W-axis slider 110 and the guide arm 142 is defined as the W-axis. The W-axis is parallel to the Z-axis.

A power supply bar 154 composed of a conductive material is attached to one surface of the guide arm 142, and in the present embodiment, the side surface of the guide arm 142 facing the column 104, the X slider 106, and the ram 108. The power supply bar 154 is connected to a machining power supply device (not illustrated) via a cable 156. A power supply element assembly 10 is attached to the lower end of the guide arm 142. The machining power supply device is connected to a machine controller (not illustrated) of the electric discharge machine 100 and is controlled by the machine controller.

Figure 4:
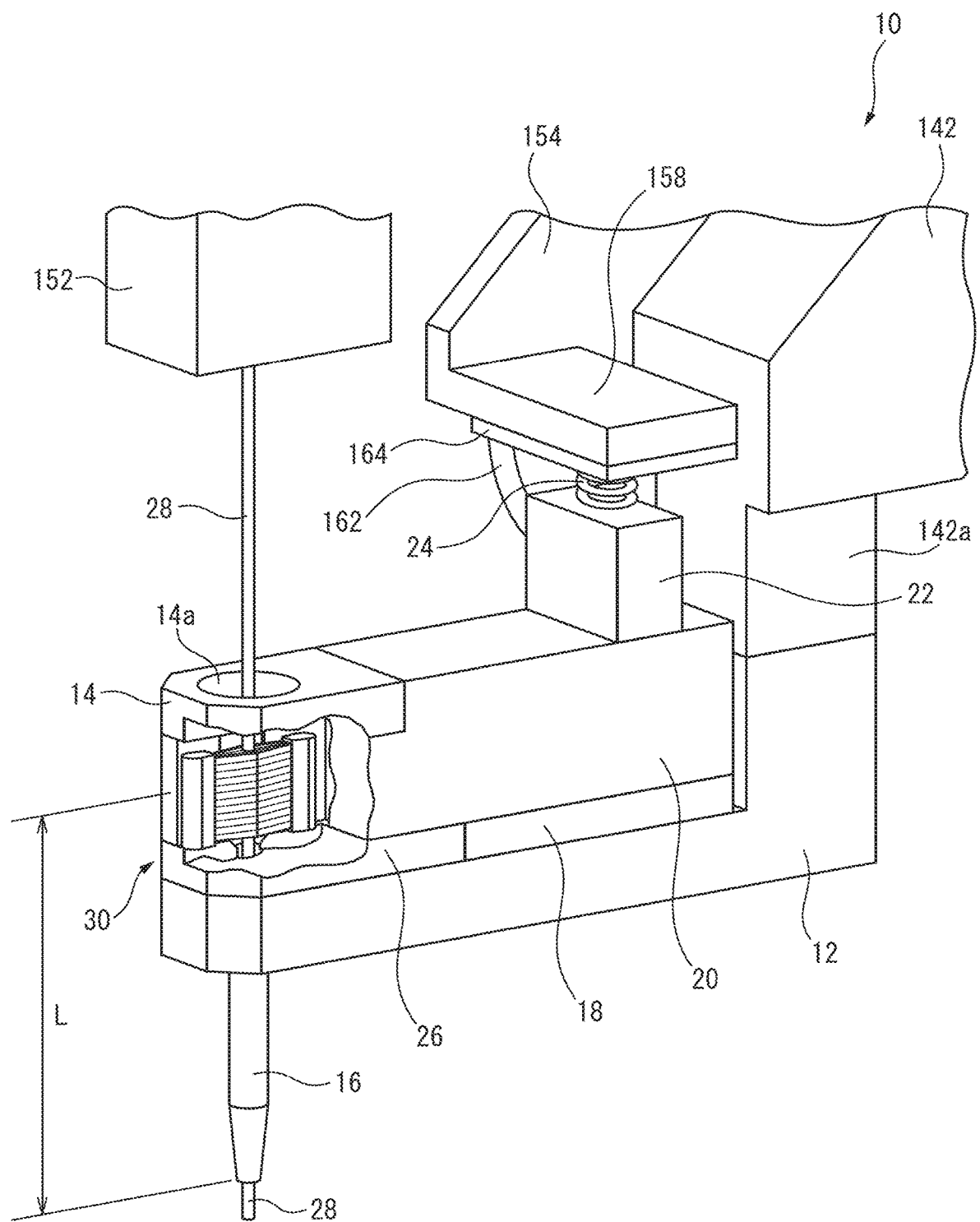
FIG. 4 is a partially broken perspective view of a power supply element assembly.
Figure 5:
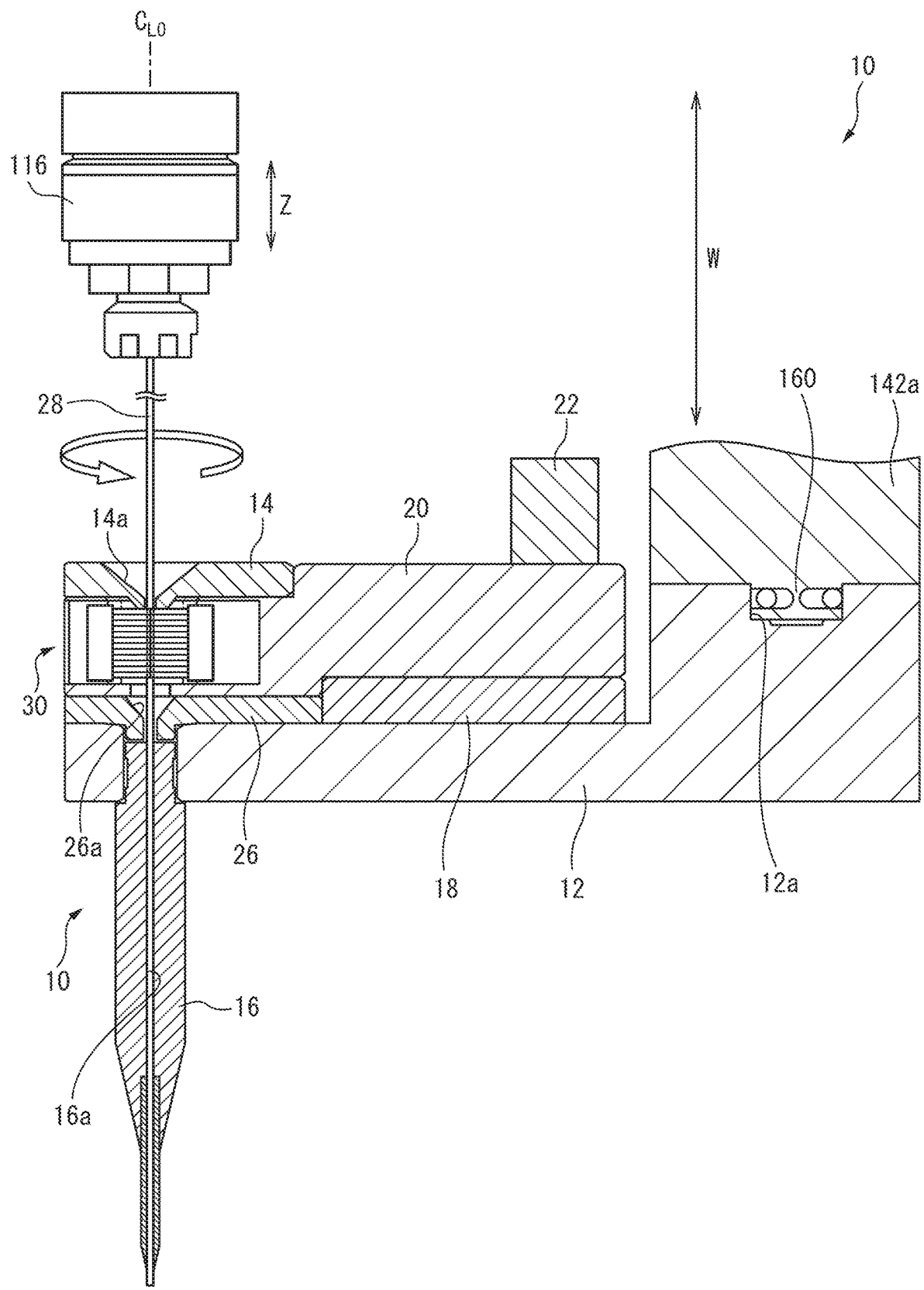
FIG. 5 is a side cross-sectional view of a power supply element assembly shown along with an electrode holder.

Referring to FIGS. 4 and 5, the power supply element assembly 10 comprises a guide plate 12, a power supply base 20, a power supply brush assembly 30, and a power supply block 22 as primary constituent elements.

The guide plate 12 is formed from a rectangular plate material, and an engagement hole 12a for engagement with a chuck 160 provided on the lower end 142a of the guide arm 142 is formed in the upper surface of the rear part (the right side in FIG. 5) of the guide plate 12. By engaging the chuck 160 with the engagement hole 12a, the guide plate 12 is attached to the lower end of the guide arm 142.

The power supply base 20, which is composed of a conductive material, is attached to the upper surface of the guide plate 12 via an insulating plate 18. A first introduction plate 14 is attached to an upper surface of the power supply base 20 on the tip side. The first introduction plate 14 has an introduction hole 14a having a conical surface for guiding a pipe electrode 28 in the power supply base 20. The first introduction plate 14 is positioned and affixed to the power supply base 20 so that the apex of the conical surface of the introduction hole 14a is on the lower side and is arranged on the central axis $C_{L0}$ of the spindle 114.

An electrode guide 16 is attached to the lower part of the power supply assembly 10 as a positioning guide for inserting the lower end of the pipe electrode 28 movably in the axial direction and supporting the lower end of the pipe electrode 28. The electrode guide 16 projects downward from the lower surface of the guide plate 12, i.e., in the direction approaching a table 118, along the central axis $C_{L0}$ of the spindle 114 at the tip portion on the side opposite the engagement hole 12a of the guide plate 12. The electrode guide 16 has an inner cavity 16a extending in the longitudinal direction, and is positioned with respect to the guide plate 12 so that the center of the inner cavity 16a is coaxial with the central axis $C_{L0}$. The inner cavity 16a has an inner diameter slightly larger than the outer diameter of the pipe electrode 28.

In the power supply base 20, a power supply brush assembly 30 is arranged on the lower side of the first introduction plate 14 directly above the electrode guide 16. The power supply brush assembly 30 comprises a pair of power supply brushes 32, 34. The power supply brushes 32, 34 have base parts 32a, 34a which are composed of a conductive material, and a large number of bristles 32b, 34b which are anchored in one side surface of the base parts 32a, 34a, respectively.

Figure 6:
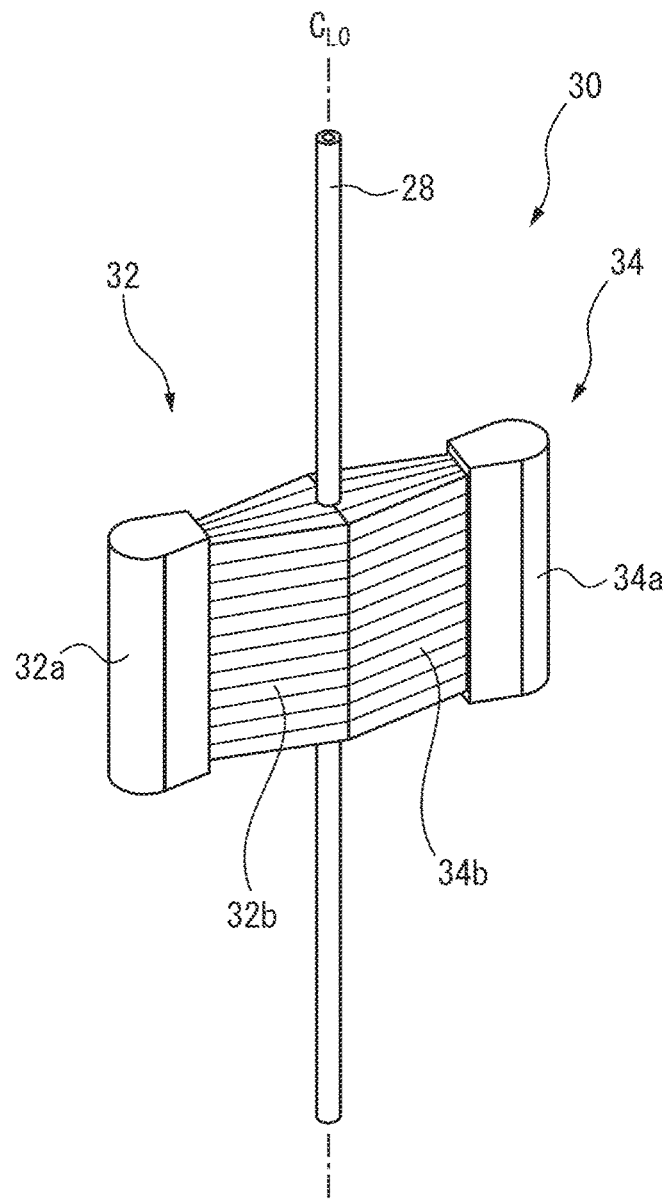
FIG. 6 is a perspective view of a power supply brush assembly shown along with a pipe electrode.
Figure 7:
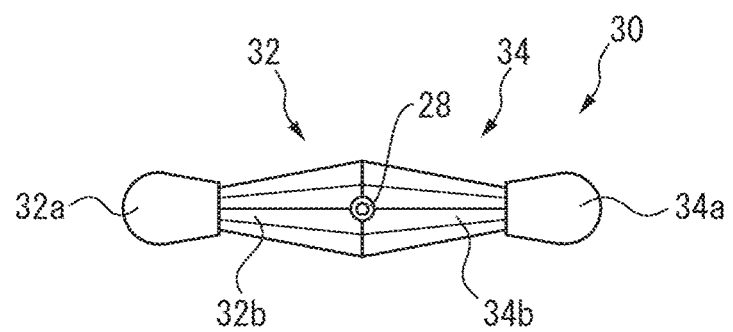
FIG. 7 is a plan view of the power supply brush assembly of FIG. 6.

The pair of power supply brushes 32, 34 are arranged symmetrically with respect to the central axis $C_{L0}$ of the spindle 114, as shown in FIGS. 6 and 7, so that in the power supply base 20, each of the bristles 32b, 34b extends in the transverse direction and the tip parts thereof face each other. The pair of power supply brushes 32, 34 are affixed to the power supply base 20 so as to be detachable and in electrical contact.

Figure 8:
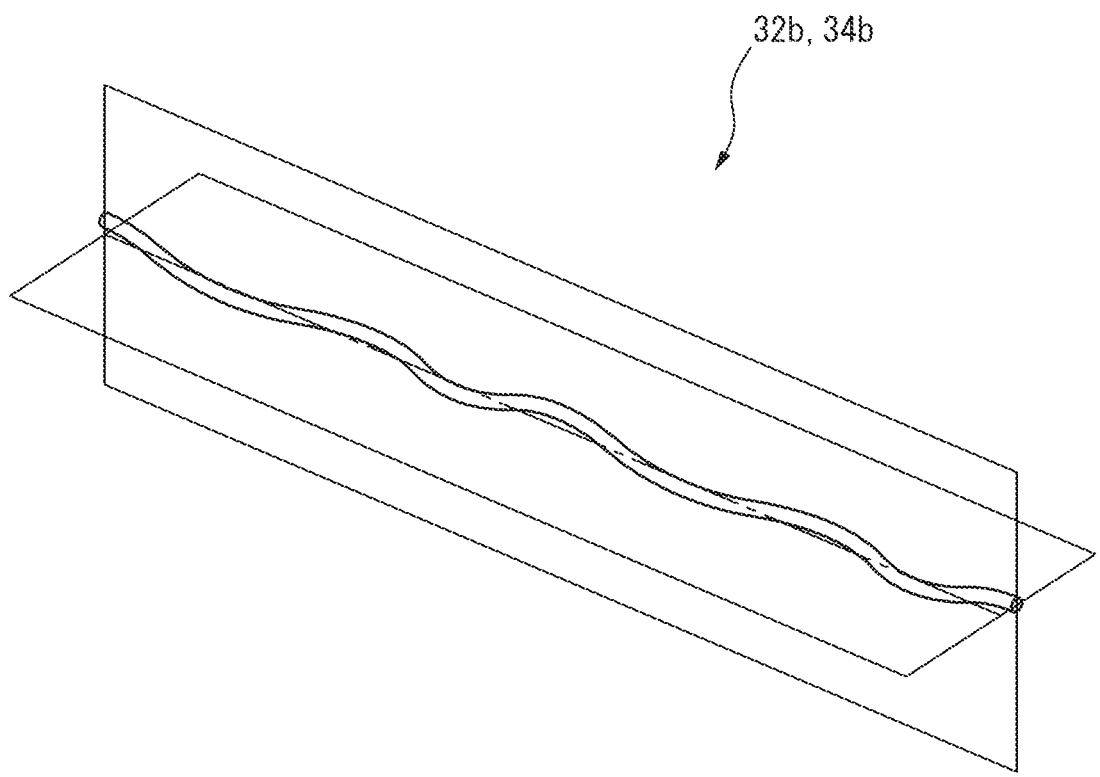
FIG. 8 is a perspective view showing an example of a bristle used in the power supply brush.
Figure 9:
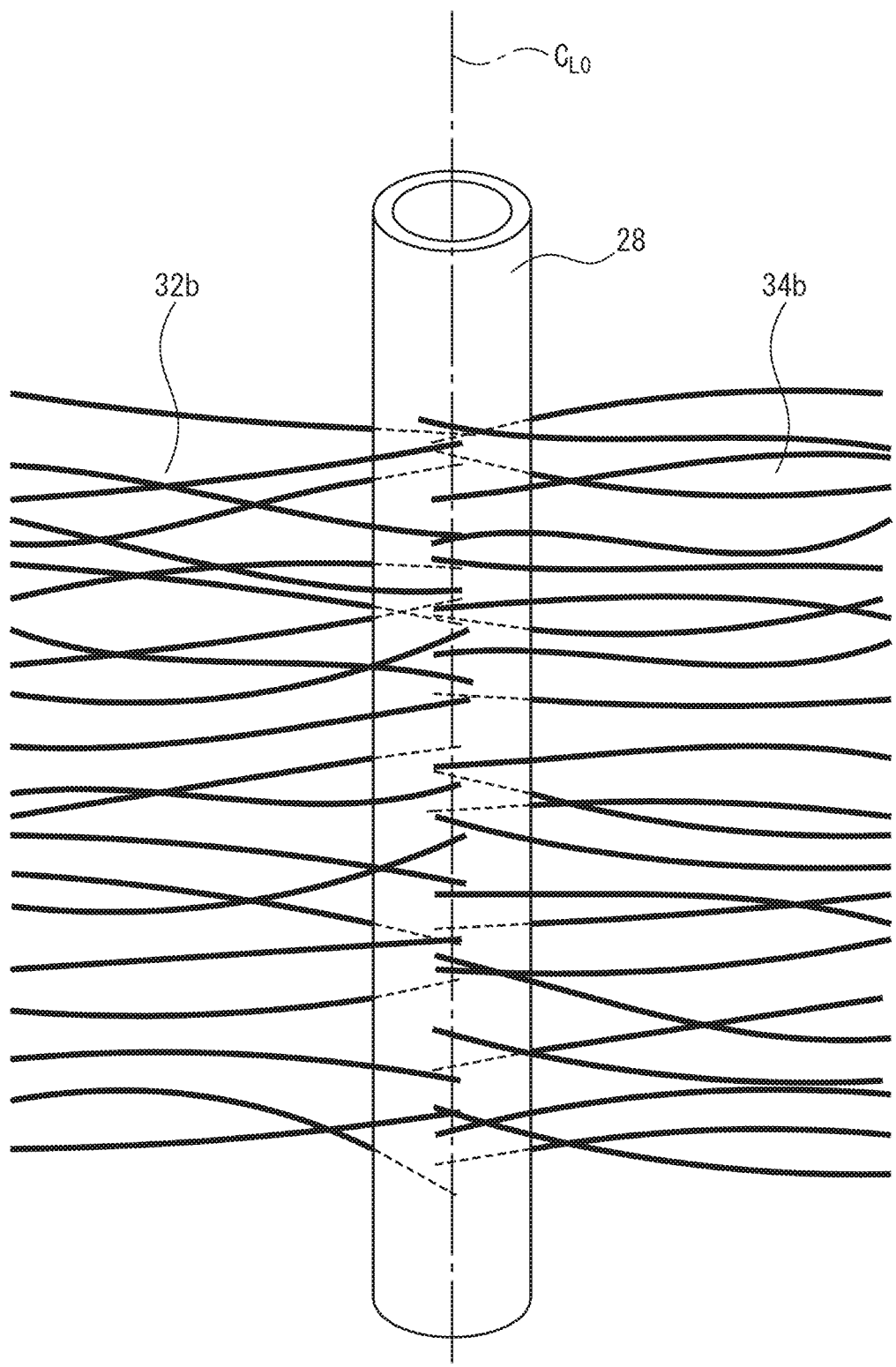
FIG. 9 is an enlarged schematic view of bristle tips of a power supply brush shown along with a pipe electrode.

The bristles 32b, 34b are formed from wire rods composed of a relatively flexible conductive material such as brass, and are preferably formed so as to be three-dimensionally wavy, as shown in FIG. 8. By forming the bristles 32b, 34b so as to be three-dimensionally wavy, gaps are secured between the bristles 32b, 34b, and as shown in FIG. 9, it becomes easy to insert the pipe electrode 28 into the dense bristles 32b, 34b while ensuring contact with the pipe electrode 28.

The pipe electrode 28 is inserted by pressing into the gaps between the bristles 32b, 34b. At this time, by rotating the pipe electrode 28 at high speed, flexibility of the pipe electrode 28 is suppressed. Further, by rotating the pipe electrode 28 at high speed, the friction between the bristles 32b, 34b and the pipe electrode 28 is reduced, whereby the pipe electrode 28 can be inserted into the dense bristles 32b, 34b without bending. By using bristles which are thinner than the pipe electrode, the bristles 32b, 34b can easily be deformed and gaps for inserting the pipe electrode 28 are secured. Further, the bristles 32b, 34b come into contact with the surface of the pipe electrode 28 due to the elastic force thereof. A plurality of bristles 32b, 34b contact the pipe electrode 28 simultaneously, whereby power can be stably supplied.

Figure 10:
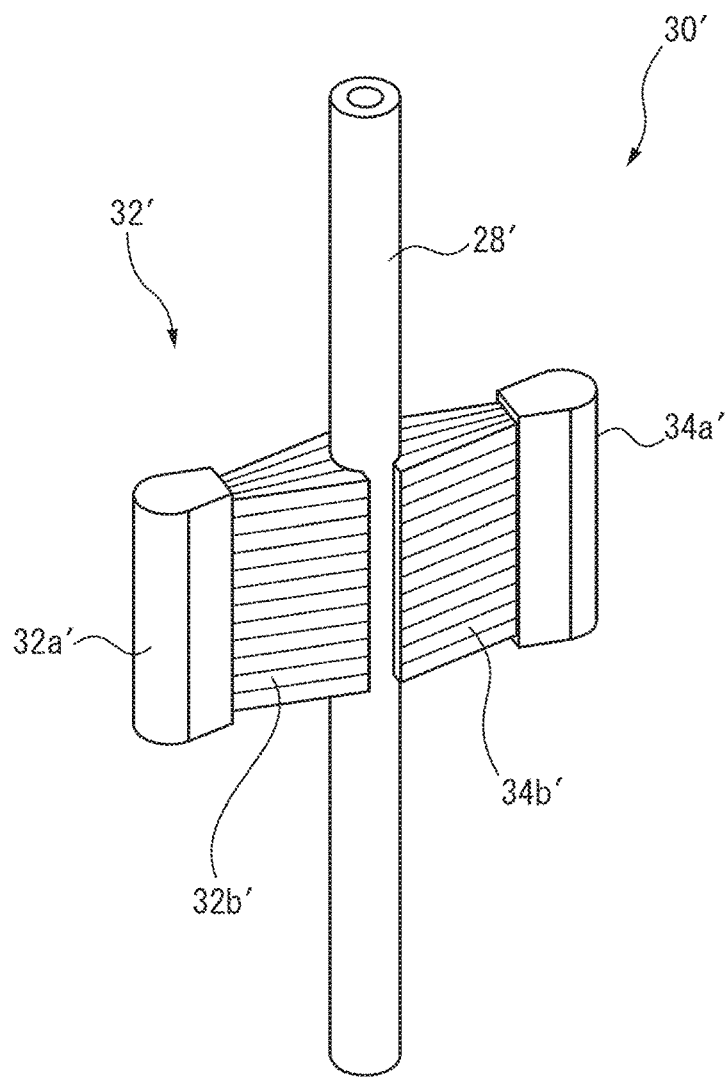
FIG. 10 is a perspective view identical to FIG. 6, showing another example of a power supply brush assembly.
Figure 11:
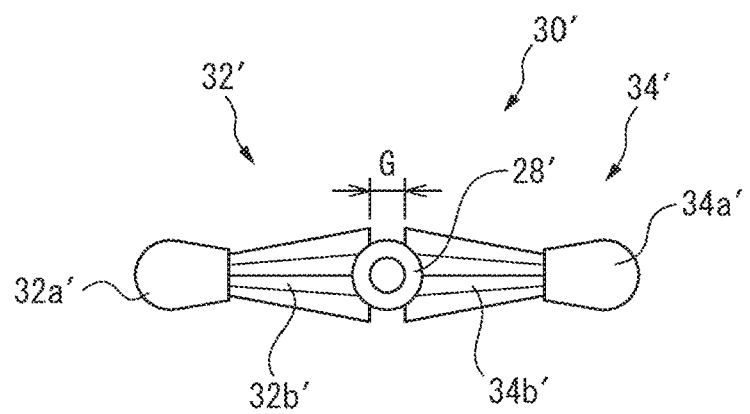
FIG. 11 is a plan view of the power supply brush assembly of FIG. 10.

When a thick pipe electrode 28 is used, a short-bristled power supply brush assembly can be used. In FIGS. 10 and 11, in the same manner as the power supply brush assembly 30 shown in FIGS. 6 and 7, the power supply brush assembly 30' has a pair of power supply brushes 32', 34', and the power supply brushes 32', 34' have base parts 32a', 34a' composed of a conductive material, and a large number of bristles 32b', 34b' which are anchored in one side surface of base parts 32a', 34a', respectively. The bristles 32b', 34b' may be formed from wire rods composed of a conductive material such as stainless steel, which is more rigid than brass.

Though the bristles 32b, 34b of the power supply brushes 32, 34 have lengths such that the tips thereof are in contact or overlap in FIGS. 6 and 7, in FIGS. 10 and 11, the power supply brushes 32', 34' have comparatively short bristles 32b', 34b', and the tips of the bristles 32b', 34b' do not contact, whereby a gap G is formed therebetween.

Appropriate thicknesses, lengths, and materials of the bristles 32b, 34b; 32b', 34b' are selected in accordance with the outer diameter of the pipe electrode 28. The gap G can be selected to be a positive value (a state in which the bristles 32b, 34b are spaced from each other), 0 (a state in which the tips of the bristles 32b, 34b contact or do not contact each other), or a negative value (a state in which the bristles 32b, 34b partially overlap each other). These conditions are selected so that the pipe electrode 28 can be inserted into the power supply brush assemblies 30, 30' without bending and power can be stably supplied.

A second introduction plate 26 composed of an insulating material is arranged between the guide plate 12 and the power supply base 20. The second introduction plate 26 has an introduction hole 26a having a conical surface for guiding the pipe electrode 28 from the power supply base 20 into the electrode guide 16. The second introduction plate 26 is positioned and affixed to the power supply base 20 so that the apex of the conical surface of the introduction hole 26a faces the electrode guide 16 and is arranged on the central axis $C_{L0}$ of the spindle 114.

The power supply base 20 is electrically connected to the power supply bar 154 via a cable 162 and the power supply block 22. A bracket 158 protruding from the power supply bar 154 to the upper surface of the power supply base 20 is provided at the lower end of the power supply bar 154, and a coil spring 24 as a biasing means is arranged between the bracket 158 and the power supply block 22. The power supply block 22 is pressed against the upper surface of the power supply base 20 by the coil spring 24. It is preferable that an insulating plate 164 be arranged between the coil spring 24 and the bracket 158.

The pipe electrode 28 extends along the axis $C_{L0}$ between the electrode holder 116 and the electrode guide 16, and the upper end thereof is retained by the electrode holder 116. As the spindle 114 rotates about the axis $C_{L0}$, the pipe electrode 28 rotates about the axis $C_{L0}$ together with the electrode holder 116.

In the guide arm 142, at least one, and in the illustrated embodiment, five electrode retention devices 144, 146, 148, 150, 152 are arranged on a side surface facing the pipe electrode 28. Each of the electrode retention devices 144, 146, 148, 150, 152 has a pair of fingers 144a, 144b; 146a, 146b; 148a, 148b; 150a, 150b; 152a, 152b extending horizontally from the guide arm 142, and pads 144c, 144d; 146c, 146d; 148c, 148d; 150c, 150d; 152c, 152d attached to tips of the fingers 144a, 144b; 146a, 146b; 148a, 148b; 150a, 150b; 152a, 152b, respectively.

Figure 2:
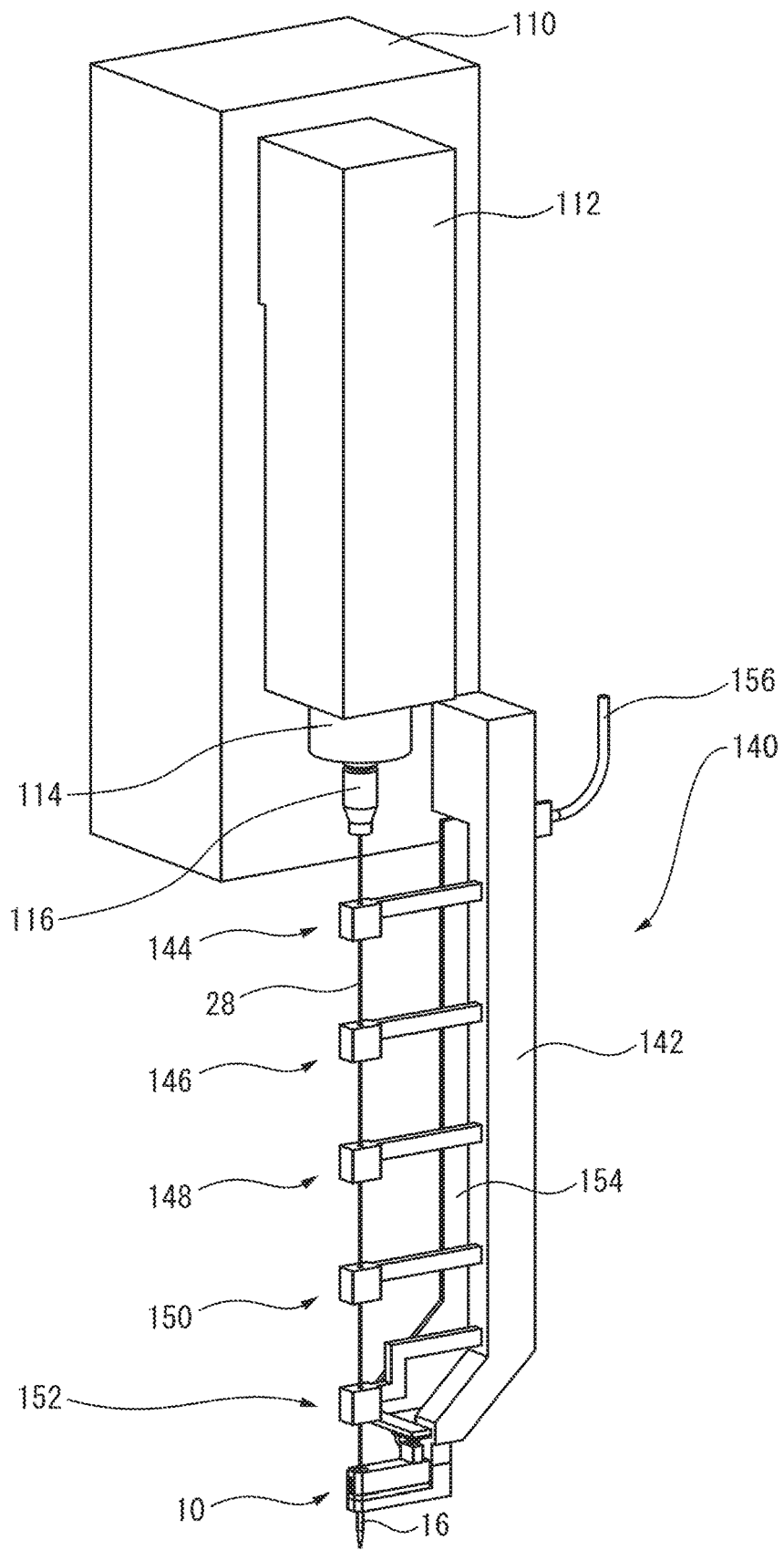
FIG. 2 is a perspective view showing a Z-axis slider, a spindle head, and a guide arm of the narrow-hole electric discharge machine of FIG. 1 when an electrode retention device is closed.
Figure 3:
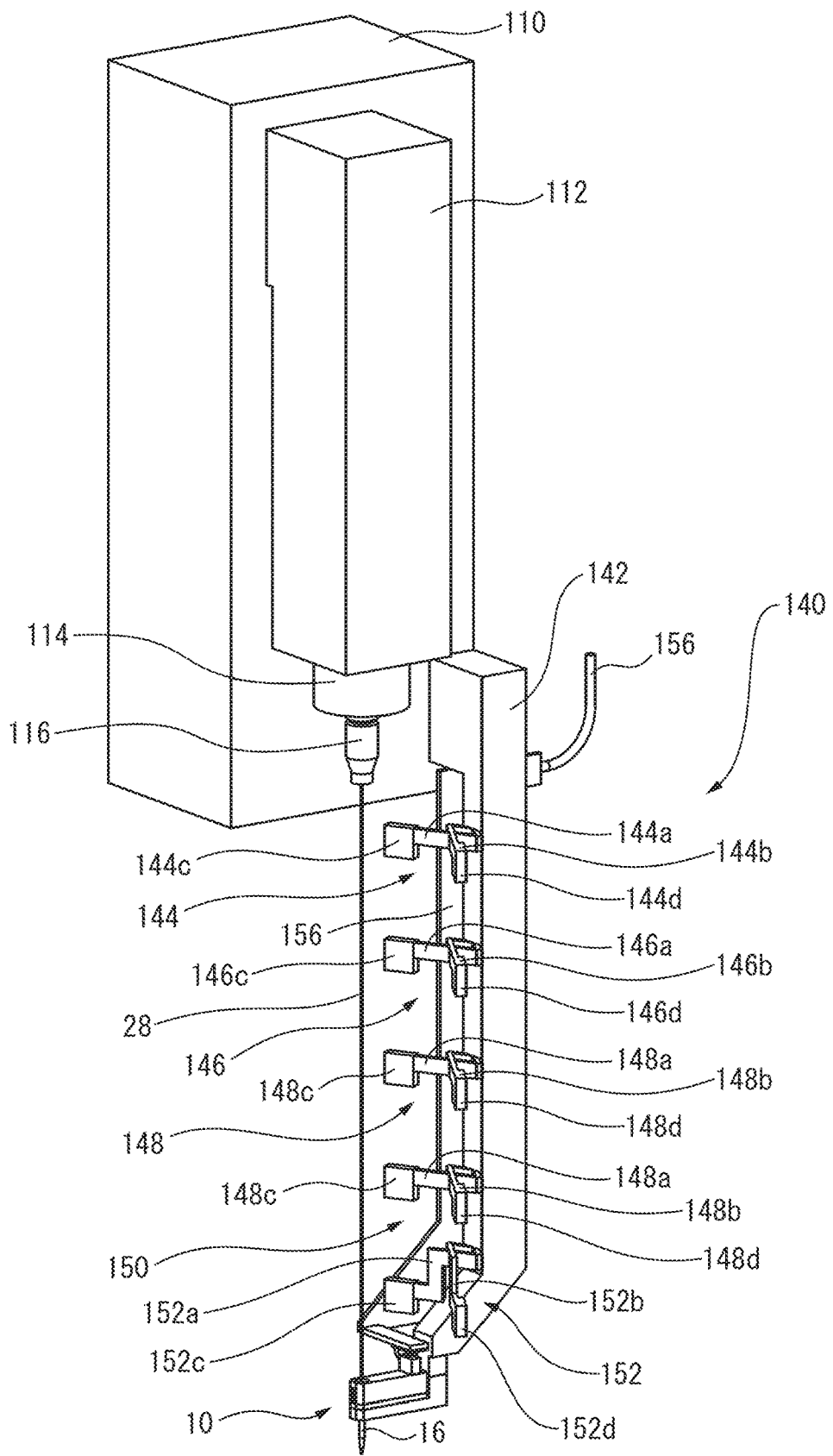
FIG. 3 is a perspective view showing a Z-axis slider, a spindle head, and a guide arm of the narrow-hole electric discharge machine of FIG. 1 when an electrode retention device is open.

Each pair of fingers 144a, 144b; 146a, 146b; 148a, 148b; 150a, 150b; 152a, 152b is pivotably attached to the guide arm 142 so as to be close to and spaced from each other in the horizontal direction centered on a common vertical axis. In FIG. 2, the electrode retention devices 144, 146, 148, 150, 152 are in closed positions in which the pads 144c, 144d; 146c, 146d; 148c, 148d; 150c, 150d; 152c, 152d contact each other, and in FIG. 3, are in open positions in which the pads 144c, 144d; 146c, 146d; 148c, 148d; 150c, 150d; 152c, 152d are spaced from each other. When the electrode retention devices 144, 146, 148, 150, 152 are in closed positions, the pipe electrode 28 is slidably retained between the pads 144c, 144d; 146c, 146d; 148c, 148d; 150c, 150d; 152c, 152d. The material of the pads 144c, 144d; 146c, 146d; 148c, 148d; 150c, 150d; 152c, 152d is preferably a sponge having an appropriate frictional force when the pipe electrode 28 slides in the axial direction or rotates.

A machining fluid such as, for example, water is supplied to the interior of the pipe electrode 28 via a machining fluid supply conduit (not illustrated) provided in the spindle 114 and a machining fluid supply conduit (not illustrated) formed in the electrode holder 116, and the machining fluid is sprayed from the tip (lower end) of the pipe electrode 28. Note that oil may be used as the machining fluid. The electric-discharge machine 100 includes a machining fluid supply device (not illustrated) which supplies the machining fluid into the pipe electrode 28.

The table 118 is arranged on the upper surface of the bed 102 in front of the column 104. An inclining rotating table device 120 is mounted on the upper surface of the table 118. The inclining rotating table device 120 comprises a pair of front and rear support members 122 projecting upward from the upper surface of the table 118, an inclining member 124 which is supported between the front and rear support members 122 so as to be capable of pivoting in the B-axis direction about a pivot axis $C_{Lb}$ extending in the Y-axis direction, and a rotating table 126 on the left end surface of the inclining member 124 which is rotatably supported in the A-axis direction about the rotation axis $C_{La}$ perpendicular to the pivot axis $C_{Lb}$. A chuck 128 is provided on the rotating table 126, and a workpiece 130 is attached to the chuck 128. The workpiece 130 is, for example, a turbine blade or vane used in a gas turbine, and a cooling hole for flowing cooling air for cooling the surface of the turbine blade is formed in the surface of the turbine blade.

A machining chamber 132 which can be raised and lowered so as to surround the entirety of the table 118 and the inclining rotating table device 120 is provided around the table 118. The alternate long and short dashed line in FIG. 1 represents a machining state in which the machining chamber 132 is raised, and in a non-machining state, such as during setup operations, the machining chamber 132 is lowered, as shown by the solid line. The electric-discharge machine 100 comprises a machining chamber drive device (not illustrated) which raises and lowers the machining chamber 132. When the machining chamber 132 is raised, the machining fluid is supplied from the machining fluid supply device to the machining chamber 132. The machining chamber drive device is connected to the machine controller of the electric-discharge machine 100, and the machine controller controls the supply of the machining fluid to the pipe electrode 28 and the machining chamber 132.

Though illustration thereof has been omitted, the electric-discharge machine 100 of FIG. 1 comprises an X-axis drive unit which moves the X slider 106 in the left-right directions, a Y-axis drive unit which moves the ram 108 in the front-rear directions, a W-axis drive unit which moves the W-axis slider 110 in the up-down directions, a Z-axis drive unit which moves the spindle head 112 in the up-down directions, a spindle drive unit which rotates the spindle 114 about the axis $C_{L0}$, a B-axis drive unit which inclines the inclining member 124 via the pivot axis $C_{Lb}$, and an A-axis drive unit which rotates the rotating table 126 via the rotation axis $C_{La}$.

The X-axis drive unit, Y-axis drive unit, Z-axis drive unit, and W-axis drive unit are each composed of, for example, a ball screw and a servomotor which rotationally-drives the ball screw, the spindle drive unit is composed of, for example, a spindle motor, and the B-axis drive unit and A-axis drive unit each are composed of, for example, a DD (direct drive) servomotor. The X-axis drive unit, Y-axis drive unit, Z-axis drive unit, W-axis drive unit, spindle drive unit, B-axis drive unit, and A-axis drive unit are controlled by an NC device (not illustrated) of the electric-discharge machine 100. As a result, the electrode holder 116 and the electrode guide 16 can be moved relative to the workpiece 130 in the X-axis direction, Y-axis direction, and Z-axis direction, and can be moved relative to the workpiece 130 in the B-axis direction and the A-axis direction.

A W-axis position detector 108a such as a linear scale for detecting the position of the W-axis slider 110 in the up-down directions is provided on the front surface of the ram 108. The W-axis position of the electrode guide 16 can be detected by the signal from the W-axis position detector 108a. A Z-axis position detector 110a such as a linear scale for detecting the position of the spindle head 112 in the up-down directions relative to the W-axis slider 110 is provided on the front surface of the W-axis slider 110. The position of the electrode holder 116, i.e., the position of the upper end portion of the pipe electrode 28, can be detected by the signal from the Z-axis position detector 110a and the signal from the W-axis position detector 108a. The W-axis position detector 108a and the Z-axis position detector 110a are connected to the NC device of the electric-discharge machine 100, and the Z-axis drive unit and the W-axis drive unit can be controlled based on the signals from the W-axis position detector 108a and the Z-axis position detector 110a.

The electric-discharge machine 100 comprises finger drive units (not illustrated) which independently drive the fingers 144a, 144b; 146a, 146b; 148a, 148b; 150a, 150b; 152a, 152b of the electrode retention devices 144, 146, 148, 150, 152. The finger drive units are controlled by the machine controller of the electric-discharge machine 100 based on the position of the electrode holder 116 in the up-down directions.

In the present embodiment, by raising and lowering the spindle head 112 with respect to the W-axis slider 110, the distance between the electrode holder 116 and the electrode guide 16 can be adjusted, and regardless of changes in the length of the pipe electrode 28 due to wear of the pipe electrode 28, the upper and lower ends of the pipe electrode 28 can always be supported by the electrode holder 116 and the electrode guide 16 during machining. At that time, to prevent interference between the electrode holder 116 and the electrode retention devices 144, 146, 148, 150, 152, as the spindle head 112 moves down along the Z axis, first, the topmost electrode retention device 144 moves to the open position, and next, the electrode retention device 146 therebelow moves to the open position, and in this manner, the electrode retention devices 144, 146, 148, 150, 152 move to the open position sequentially from the top. At this time, there is no interference between the electrode retention devices 144, 146, 148, 150, 152, which are in the open position, and the spindle head 112, and the electrode holder 116 can be lowered until it comes closest to the power supply element assembly 10.

Though illustration thereof has been omitted, an electrode magazine can be provided on the side of the W-axis guide assembly 140. The electrode magazine holds a plurality of replacement pipe electrodes 28 mounted on a plurality of electrode holders 116, each having a predetermined initial length, and pipe electrodes 28 can be exchanged between the spindle 114 and the electrode magazine together with the electrode holders 116 by an exchange means (not illustrated). Pipe electrodes 28 having various outer diameters may be prepared in the electrode magazine.

The electric-discharge machine 100 can comprise a guide magazine (not illustrated) for housing a plurality of electrode guides 16. The sizes of the electrode guides 16 are selected in accordance with the outer diameter of the pipe electrode 28 to be used, and various electrode guides 16 can be prepared and stored in advance in the guide magazine in a state in which a guide plate 12, an insulating plate 18, a power supply base 20, and a power supply brush assembly 30 in a form suitable for the outer diameter of the pipe electrode 28 to be used are integrated. A desired electrode guide 16 is attached to, detached from, and exchanged from the guide arm 142 at a portion of the chuck 160 by an unillustrated guide exchange device.

Since the power supply brush assemblies 30, 30' are provided at a predetermined position directly above the electrode guide attached to the guide arm 142 in the present embodiment, as described above, regardless of the length of the pipe electrode 28, the distance L from the power supply position to the tip of the electrode guide 16 is always constant. Thus, the machining current between the pipe electrode 28 and the workpiece 130 becomes constant, the machining speed and the hole diameter to be machined do not change, and narrow holes can be stably machined.

DESCRIPTION OF REFERENCE SIGNS 10 power supply element assembly
12 guide plate
16 electrode guide
20 power supply base
22 power supply block
28 pipe electrode
30 power supply brush assembly
32 power supply brush
34 power supply brush
100 electric-discharge machine
112 spindle head
114 spindle
116 electrode holder
118 table
142 guide arm
144 electrode retention device

The invention claimed is:

1. A narrow-hole electric discharge machine which performs electric-discharge machining on a workpiece by moving a narrow-hole electrode mounted on a spindle and a workpiece attached to a table relative to each other, the narrow-hole electric discharge machine comprising:

a positioning guide which is attached to a guide arm below the spindle and in which a lower part of the narrow-hole electrode is inserted and supported so that the narrow-hole electrode can move in an axial direction, and a power supply element which is provided in a predetermined power supply position directly above the positioning guide of the guide arm and which directly contacts the narrow-hole electrode, which is movable in the axial direction, and supplies power thereto, wherein:

the power supply element comprises a pair of power supply brushes having a large number of bristles composed of a flexible conductive material which is thinner than the pipe electrode, the power supply brushes are arranged symmetrically with respect to a central axis of the spindle so that each of the bristles extends in a transverse direction relative to the axial direction of the narrow-hole electrode, and the narrow-hole electrode inserted into the power supply element contacts the tips of the bristles, and a distance from the power supply position to a tip of the positioning guide, which is closest to the workpiece, is constant regardless of the length of the narrow-hole electrode.

2. The narrow-hole electric discharge machine according to claim 1, wherein the power supply element further comprises a first introduction plate which is arranged above the power supply brush and which has a narrow-hole electrode introduction hole having a conical surface, and the first introduction plate is arranged on a movement path of the narrow-hole electrode with an apex of the conical surface facing toward the power supply brush.

3. The narrow-hole electric discharge machine according to claim 2, wherein the power supply further comprises a second introduction plate arranged below the power supply brush and having a narrow-hole electrode introduction hole having a conical surface, and the second introduction plate is arranged on a movement path of the narrow-hole electrode with an apex of the conical surface facing toward the positioning guide.

4. The narrow-hole electric discharge machine according to claim 1, further comprising at least one electrode retention device, arranged between the spindle and the power supply element, for retaining a side surface of the narrow-hole electrode, wherein the at least one electrode retention device comprises a pair of pads provided so as to be capable of contacting the side surface of the narrow-hole electrode and a pair of fingers which are capable of being driven so as to bring the pair of pads closer to each other and separate them from each other.

5. The narrow-hole electric discharge machine according to claim 4, wherein the pair of fingers are driven to move the pads away from the movement path of the narrow-hole electrode in accordance with the position of the spindle so that the electrode retention device does not interfere with the spindle during electric-discharge machining.

* * * * *